Figure 1A:
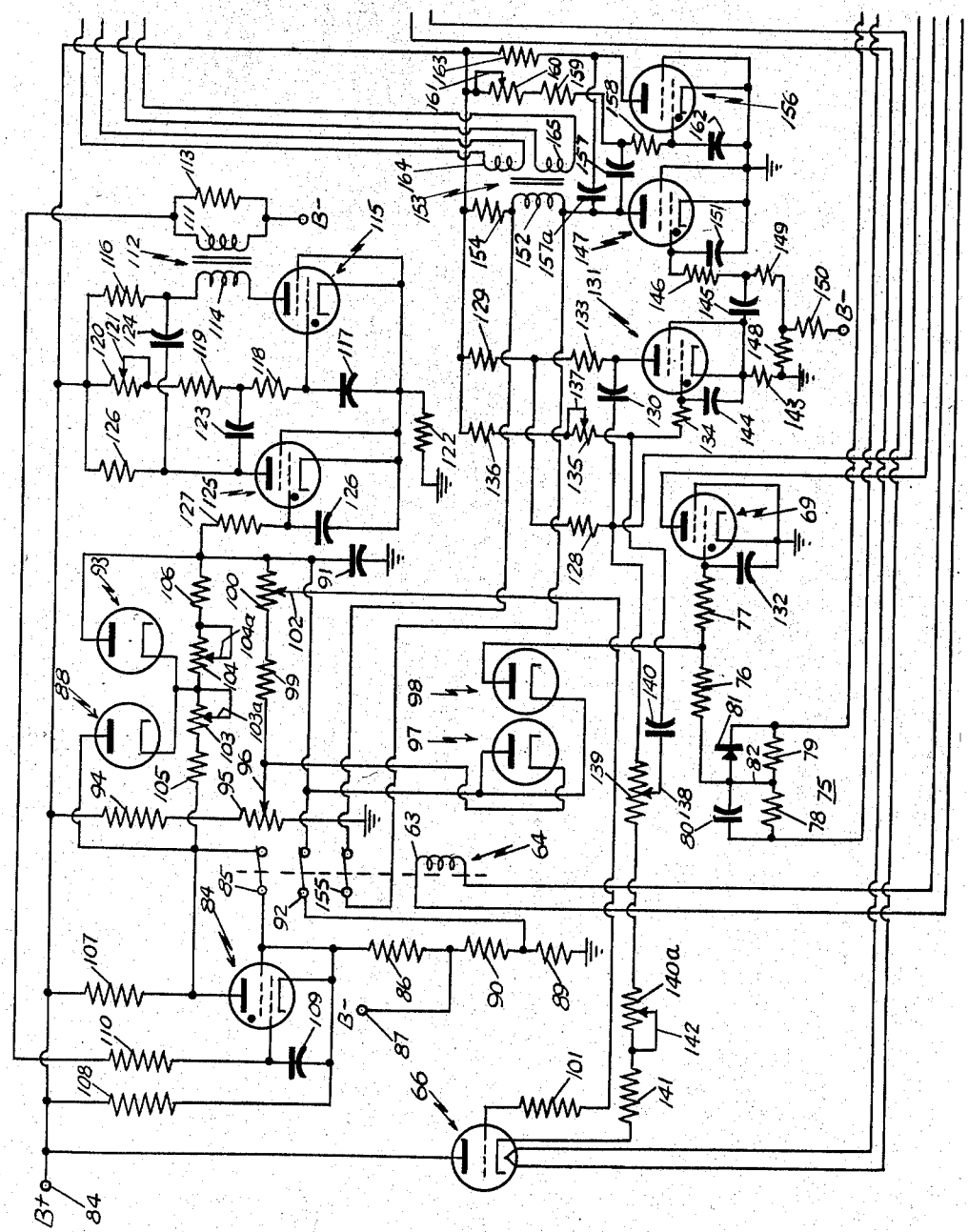

INVENTORS
ANTHONY V. RAINIS
JOSEPH R. ARSENAULT
BY Elmer J. Gorn
ATTORNEY

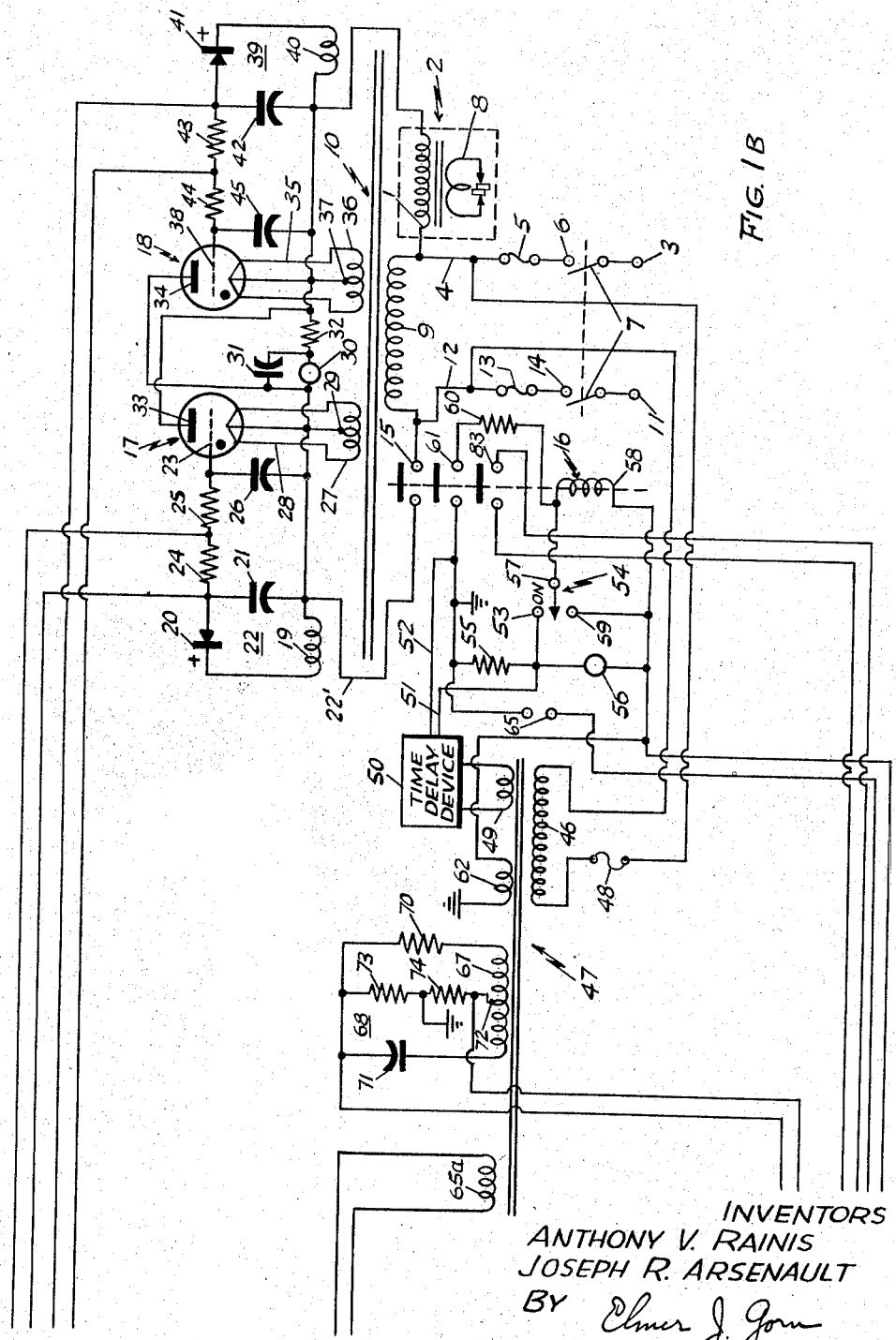

United States Patent Office 2,875,335
Patented Feb. 24, 1959

2,875,335

HEAT PROGRAM CONTROLS

Anthony V. Rainis, Waltham, and Joseph R. Arsenault, Lexington, Mass., assignors to Raytheon Manufacturing Company, Waltham, Mass., a corporation of Delaware Application July 12, 1956, Serial No. 597,397

8 Claims. (Cl. 250—27)

The present invention relates generally to electric welding systems, and more particularly to a system for preselecting the pattern of welding current during the course of a welding operation.

The present invention is applicable to a wide field of heat treatment, by permitting a weld current pattern to be preselected for a particular operation. The weld current pattern available, in accordance with the present invention, involves generally the selection of a low heat current level, which is a function of an intermediate current level, a rate of increase from the low heat level to said intermediate current level, a duration for said intermediate current level, the latter being in turn followed by a period of current decay to a final heat current level. In accordance with the present invention, the preselection of any particular portion of the pattern does not interact with the selection of any other portion of the pattern, with the exception that low heat current is a predetermined percentage of the intermediate current level.

The above and further objects and advantages of the present invention will become apparent upon consideration of the following detailed description of specified embodiments of the invention, especially when taken in conjunction with the appended drawing wherein:

Figs. 1A and 1B together illustrate schematically the circuit diagram of a welding system arrangement in accordance with the invention.

Briefly, the present invention provides for scheduling the current pattern of a welding system by controlling the firing periods of a pair of thyratrons, connected in back-to-back relation in series with the primary winding of a welding transformer. The thyratrons, which control current for the primary winding of the welding transformer, are fired by a pulse generating circuit.

The pulse generating circuit contains a plurality of controls for preselecting portions of the desired current pattern. In essence, pulses are generated to fire the thyratrons on each successive half cycle that the anodes of said thyratrons are positive, said pulses having a time relationship to the periods when said anodes are positive such that the average current generated by said thyratrons will conform to the desired current pattern. A timing capacitor is employed to generate the basic current pattern. The controls mentioned previously are adjusted to control the charge and discharge times of said capacitor. Portions of the system are responsive to the current pattern developed across said capacitor for generating trigger pulses at the proper periods of time in order to generate said preselected pattern in the primary winding of said welding transformer.

Referring now to Fig. 1B, there is shown a primary winding 1 of a welding transformer 2 having one terminal thereof connected to one terminal 3 of an A.-C. line (not drawn) through a conductor 4, fuse 5 and a pair of normally open contacts 6 of a switch 7. A secondary winding 8 of the welding transformer 2 is energized by the primary winding 1. A primary winding 9 of a transformer 10 has one terminal thereof connected to the line 4 and a second terminal thereof connected to a second terminal 11 of said A.-C. line through a conductor 12, fuse 13 and another pair of normally open contacts 14 of the switch 7. The second terminal of the primary winding 9 is also connected to one of a pair of normally open contacts 15 of a relay 16. Current for the primary winding 1 of the welding transformer is generated by a pair of thyratrons 17 and 18 connected in inverse parallel and in series with the A.-C. source voltage through another of said pair of contacts 15. The alternating current source can not be applied to said thyratrons until said open contacts 15 close. A secondary winding 19, a diode rectifier 20 and a capacitor 21 form a bias circuit 22 for the control grid 23 of the thyratron 17. The secondary winding 19 has one end thereof connected to the cathode of the diode 20 and the second terminal thereof is connected to said other of the pair of contacts 15 through a lead 22'. The anode of the diode 20 is connected through resistors 24 and 25 to the control grid 23. The capacitor 21 is connected from the junction of the anode of the rectifier 20 and the resistor 24 to the lead 22'. A capacitor 26 is also connected from the control grid 23 to the lead 22'. A secondary winding 27 of the transformer 10 is connected to the filament 28 of the thyratron 17; a center tap 29 of the secondary winding 27 is also connected to the lead 22'. A neon lamp 30, shunted by a capacitor 31, has one terminal thereof connected to the center tap 29 and a second terminal connected to a resistor 32. The lamp, capacitor, and resistor form a voltage indicating device and are used to adjust power factor to the welding transformer and load. An anode 33 of the thyratron 17 is connected to the resistor 32. An anode 34 of the thyratron 18 is connected to the juncion of the center tap 29 and the lamp 30. A filament 35 of the thyratron 18 is energized by a secondary winding 36 of the transformer 10; a center tap 37 of the secondary winding 36 is connected to the resistor 32. A control grid 38 is biased by a bias circuit 39, comprising identical components as the bias circuit 22. A secondary winding 40 of the transformer 10 has one end thereof connected to the cathode of the diode rectifier 41 and a second terminal thereof is connected to the center tap 37. The anode of the rectifier 41 is connected to a capacitor 42, having a second terminal connected to the center tap 37 and to the primary winding 1 of the welding transformer. The anode of the rectifier 41 is also connected to the control grid 38 through the resistors 43 and 44. A capacitor 45 is connected from the control grid to the center tap 37 in the cathode of the thyratron 18.

A primary winding 46 of a transformer 47 is connected across the conductors 4 and 12 and is protected by the fuses 5, 13, and a fuse 48 connected in series with the primary winding 46. A secondary winding 49 of the transformer 47 energizes a time delay device 50. After a preselected time interval, a pair of contacts within the time delay close, internally shorting lead 51 to ground through a lead 52. A contact 53 of a switch 54 is connected to the lead 51 and to ground through a resistor 55. A neon lamp 56 is connected in series with the resistor 55. A movable contact 57 of the switch 54 is connected to one end of a solenoid 58 of the relay 16. Another end of the solenoid 58 is connected to ground through the lamp 56 and the resistor 55, and to another contact 59 of the switch 54. The solenoid 58 is also connected to ground through a resistor 60 and a pair of normally open contacts 61 of the relay 16 from the end connected to the movable contact 57. A secondary winding 62 of the transformer 47 has one end thereof connected to ground and a second end connected to the junction of the lamp 56 and the solenoid 58; the secondary winding may furnish 115 volts A.-C. to energize the solenoid 58.

Referring now to Fig. 1A, a solenoid 63 of a relay 64 is connected to the output of the secondary winding 62 and is returned to ground through a pair of normally open contacts 65 of an initiation switch (not shown). The switch is preferably mounted on the welding device to enable an operator of the equipment to energize the equipment at will.

Primary power is supplied to the system when the switch 7 is closed and the movable contact 57 is connected to the contact 53, the On position, of the switch 54. High voltage is delayed until the internal contacts of the time delay relay 50 short out the resistor 55. The lamp 56 glows brightly after the large resistance of resistor 55 is short circuited. In addition, the thyratrons 17 and 18 are held in standby condition by the closing of the contacts 15. The closing of the initiation switch enables the relay 64 to become energized and activates the system.

Referring back again to Fig. 1B, a secondary winding 65a of the transformer 47 energizes a filament of a cathode follower 66. A secondary winding 67 of the transformer 47 is a component of a phase-shift circuit 68, the output of which is used to bias a control grid of a gaseous tetrode 69. A resistor 70 and a capacitor 71 serially attached across the terminals of the secondary winding 67 shift the voltage, developed between the junction of said resistor and capacitor and a center tap 72 of said secondary winding, in excess of 90 degrees. The junction of said resistor and capacitor and the center tap are connected to ground through resistors 73 and 74. A portion of the output of the phase shift circuit 68 developed across the resistors 73 and 74 is coupled to a bias circuit 75, shown in Fig. 1A, connected to the control grid of the tetrode 69 through resistors 76 and 77. The bias circuit is comprised of the parallel arrangement of serially connected resistors 78 and 79 in one leg and a capacitor 80 and a diode rectifier 81 in another leg, the junction of the components in each leg being joined by a lead 82. The rectifier 81 is connected so that it conducts on each negative half cycle of the applied alternating current which causes the side of the capacitor 80, attached to the anode of said rectifier, to be charged negatively. However, when the applied alternating current reverses, the negative half cycle applied to the anode reinforces the existing negative voltage on the capacitor 80 so that the control grid of tetrode 69 is biased beyond cut-off for an entire cycle of the line voltage. In addition, the anode of the tetrode 69 has connected thereto a pair of normally open contacts 83 of the relay 16. When the relay 16 is energized, the anode circuit of the tetrode 69 is completed to a B+ source 84. The B+ source may conveniently be generated by suitable components energized by an additional secondary winding of one of the transformers employed herein in a manner known to the prior art.

A gaseous tetrode 84 is held inoperative by a negative voltage supplied to the control grid, screen grid and to the anode of the tetrode through a pair of normally closed contacts 85 through a resistor 86 from a B— source 87. The B— source may conveniently be generated by suitable components energized from an additional secondary winding of one of the transformers employed in a manner known to the prior art. The negative voltage of the B— source is also applied to an anode of a diode rectifier 88. A portion of the voltage developed across a resistor 89 of a voltage divider comprising said resistor and a resistor 90 between the B— source and ground charges a capacitor 91 through a pair of normally closed contacts 92 of the relay 64. An anode of a diode rectifier 93 is connected to the ungrounded side of the capacitor 91. A voltage divider, comprised of a resistor 94 and a variable resistor 95 serially connected between the B+ source and ground, may be selected so that +150 volts is available at slider 96 of the variable resistor 95. The voltage at the slider 96 is coupled to a cathode of a diode rectifier 97. The voltage on the ungrounded side of the capacitor 91 is coupled to an anode of the rectifier 97 and to a cathode of a rectifier 98. An anode of the rectifier 98 is returned to ground through the resistors 76, 78, 79, 74, and 73. The wiper arm 96 is connected to the capacitor 91 through a resistor 99 and a variable resistor 100. A portion of the voltage existing between the slider 96 and the capacitor is coupled to a control grid of the cathode follower 66 through a resistor 101 by the setting of a slider 102 of the variable resistor 100. Said slider is referred to as the Low Heat control. The cathodes of the rectifiers 88 and 93 are connected together and tied to the junction of a pair of variable resistors 103 and 104, which are serially connected to resistors 105 and 106 between the capacitor 91 and the anode of the tetrode 84. Said anode is attached to the B+ source through a resistor 107. A screen grid and a cathode of said tetrode are tied together and are connected to the B+ source through a resistor 108. The control grid and cathode of said tetrode 84 are connected by a capacitor 109 and said tetrode is triggered when the contacts 85 open and a positive pulse is coupled to the control grid through a resistor 110 from the secondary winding 111 of a transformer 112. A resistor 113 is shunt connected across said secondary winding 111 and the junction of the resistor and the secondary winding is connected to the B— source 87.

A primary winding 114 of the transformer 112 is connected between an anode of a gaseous tetrode inverter 115 and the B+ source through a resistor 116. A screen grid and a cathode of the tetrode are tied together and a control grid is connected to the cathode through a capacitor 117. The control grid is also connected to the B+ source through serially connected resistors 118 and 119, and variable resistor 120. A slider 121 of the variable resistor is referred to as the Weld Cycles control because its setting determines the period over which the tetrode 115 is non-conductive. The cathode is returned to ground through a resistor 122. The junction of the resistors 118 and 119 and the junction of the primary winding 114 and a resistor 116 are coupled via capacitors 123 and 124 to an anode of a gaseous tetrode inverter 125. An anode of a tetrode 125 is connected to the B+ supply through a resistor 126. In addition, a screen grid and a cathode of said grid tetrode are tied together and connected to the ungrounded side of the resistor 122. The control grid is tied to a cathode through a capacitor 126, and is connected to the ungrounded side of the capacitor 91 through a resistor 127.

An anode of the tetrode 69 is connected to the B+ source through serially connected resistors 128 and 129 through the normally open contacts 83 of the relay 16, shown in Figure 1B. The anode is also coupled through capacitor 130 to an anode of a gaseous tetrode 131. A screen grid and a cathode are tied together and connected to ground. A capacitor 132 is tied between the control grid and the cathode of said tetrode 69. The anode of the tetrode 131 is connected to the B+ source through resistors 133 and 129. A control grid of said tetrode 131 is connected to the B+ source through serially connected resistor 134, variable resistor 135, and resistor 136. A slider 137 of the variable resistor may be a preset adjustment for setting the time constant of said components in the control grid circuit. The output of the cathode follower 66, appearing at a slider 138 of a variable resistor 139, is coupled through a capacitor 140 to the control grid of said tetrode 131. The slider 138 is referred to as the Weld Heat control. The variable resistor 139 has one end thereof connected to the anode of the tetrode 69 and is serially connected through a variable resistor 140a and a resistor 141 to a cathode of said cathode follower. A slider 142 of the variable resistor 140a limits the maximum voltage developed at the slider 138. A screen grid and a cathode of said tetrode 131 are tied together and the cathode is returned to ground through a resistor 143. A capacitor 144 is connected between said control grid and cathode. Voltages developed across the resistor 143 are coupled via a capacitor 145 and a resistor 146 to the control grid of a gaseous tetrode inverter 147. The control grid of the tetrode 147 is biased with the negative voltage appearing across a resistor 148 through a resistor 149 serially connected to the resistor 146. The resistor 148 and a resistor 150 comprise a voltage divider between the B— source and ground. A screen grid and a cathode of said tetrode are tied together and connected to ground. A capacitor 151 is tied between the control grid and the cathode. An anode of said tetrode is connected to the B+ source through the primary winding 152 of a transformer 153 and a resistor 154 when a pair of normally closed contacts 155 of the relay 64 are opened; the primary winding 152 is shunted by the contacts 155. In addition, the anode of said tetrode 147 is coupled to a control grid of a gaseous tetrode inverter 156 through a capacitor 157 and a serially connected resistor 158 and said anode is coupled to the anode of the tetrode 156. The control grid of the tetrode 156 is returned to the B+ source through a resistor 159 and a variable resistor 160 serially connected to the resistor 158. A slider 161 of the variable resistor has a preset adjustment for adjusting the conducting period of the tetrode 156. A capacitor 162 is tied between the cathode and control grid of said tetrode 156. The screen grid and cathode of said tetrode are also tied together and connected to ground. The anode of said tetrode is also connected to the B+ source through a resistor 163 and is coupled to the anode of said tetrode 147 through a capacitor 157a. The components of the tetrodes 147 and 156 are selected so that the tetrode 156 conducts a half cycle after the tetrode 147 conducts. Negative pulses generated in the primary winding 152 of the transformer 153 are converted to positive pulses in the secondary windings 164 and 165 and are coupled to the control grids of the normally non-conductive thyratrons 17 and 18 across the resistors 24 and 43, and energize said thyratrons. The period of arrival of these pulses in relation to the half cycle of the applied primary voltage that makes the anodes of said thyratrons positive determines the average current that flows in the secondary winding 1 of the welding transformer.

The relay 16 becomes energized with the switch 54 in the On position after the time delay device 50 times out, and remains energized through its own contacts 61. Anytime thereafter, if the initiation switch is energized and the contacts 65 close, the system will become energized. Normally, the sliders 102, 104a, 121, 138, and 103a are preadjusted for a particular pattern of weld current. Let us assume for the purpose of explanation that these controls have been preadjusted for a particular pattern, that the various other sliders have been preset at an optimum position, and that the relay 16 has been energized. In the embodiment of the invention, the capacitor 91 is initially charged to —15 volts, tetrodes 84, 125, 69, and 147 and rectifiers 88 and 93 are nonconducting and tetrodes 115 and 156 are conducting. When the initiation switch causes the contacts 65 to close, and the capacitor 91 starts to charge from —15 volts to the magnitude of the B+ source 84, which may be of the order of 300 volts, said capacitor charges through resistor 106, variable resistor 104, and rectifier 88. However, due to the conduction of the normally conducting tetrode 115, approximately 150 volts exist across the resistor 122, so that the control grid of the tetrode 125 is effectively 150 volts more negative; thus, the tetrode 125 remains non-conducting until the capacitor charges to slightly more than 150 volts. The time required for the control grid of tetrode 125 to rise to a voltage sufficient to fire said tetrode is adjustable over a range of 2 to 10 cycles by the setting of the Up Slope Cycles control, the slider 104a, which controls the rate of increase from low heat current to an intermediate current for the pattern. When tetrode 125 fires, tetrode 115 is extinguished by the negative voltage applied to its control grid through the capacitor 123. Said tetrode 115 is rendered non-conducting for an adjustable period determined by the time constant of the capacitor 123, the resistor 119, and the setting of the slider 121, the Weld Cycles control. This control enables the duration of welding current to be adjusted over a range of 2 to 10 cycles. After the preadjusted period, the tetrode 115 conducts again, extinguishing the tetrode 125.

When the tetrode 115 conducts, a positive pulse is applied to the control grid of the tetrode 84 from the secondary winding 111, which renders said tetrode conducting. The anode of said tetrode 84 decreases to approximately —120 volts, since the cathode is tied to the B— source which may have a value of —150 volts. This causes the capacitor 91 to discharge from 150 volts through zero to —120 volts through the resistor 105, the variable resistor 103, and rectifier 93. The time for the capacitor 91 to discharge from 150 volts to zero volts is adjustable over a range of 2 to 10 cycles by the setting of the Down Slope Cycles control, the slider 103a, which controls the rate of decay from the intermediate current level to a final heat current level of the pattern.

At this point, it will be of assistance to summarize the relationship between the charging and discharging of the capacitor 91 to the preselected pattern, before proceeding. In substance, the capacitor is initially charged to —15 volts, the portion of the pattern corresponding to low heat current. After the relay 64 is energized, the capacitor 91 charges toward 300 volts over a preselected period within 2 to 10 cycles, the portion of the pattern corresponding to the rise of current to an intermediate current level by the setting of the slider 104; at substantially 150 volts, the capacitor remains charged at 150 volts for a preselected period within 2 to 10 cycles by the setting of the slider 121, the portion of the pattern corresponding to the intermediate current level. Thereafter, as the capacitor 91 discharges to —120 volts, the setting of the slider 103a determines the rate of decay from said intermediate current to a final heat current. The decay from intermediate current is also preselectable over the range of 2 to 10 cycles.

Now let us consider how the magnitude of intermediate current may be preselected and how low heat and final heat currents of the pattern are a function of said intermediate current. A portion of the voltage between the capacitor 91 and the fixed voltage existing at the slider 96 is coupled to the control grid of the cathode follower 66 while the voltage at the slider 96 is coupled to the cathode of rectifier 97. In the embodiment of the invention being described, the slider 96 was adjusted for 150 volts. In addition, the voltage across the capacitor 91 is coupled to the anode of the rectifier 97 and to the cathode of the rectifier 98. The circuit components have been selected so that, whenever the voltage on said capacitor is negative, the tetrode 69 is biased negatively and held non-conductive for each cycle that it would normally be conductive by the flow of current through the rectifier 98 to ground via the resistors 76, 78, 79, 73 and 74. Ordinarily, the tetrode 69 would conduct on each cycle when said capacitor is not charged or positively charged, in which case the thyratrons 17 and 18 will be fired by the pulses subsequently developed by the tetrodes 147 and 156. When the tetrode 69 becomes conductive, the normally conducting tetrode 131 becomes non-conductive for a period determined by the capacitor 140, the setting of the sliders 138 and 137, the resistor 136, and the cathode follower 66. The capacitor 140 is charged to approximately 200 volts when the tetrode 69 is non-conducting through the connection to the anode of said tetrode. However, when said tetrode becomes conductive, the voltage across said capacitor cannot change instantaneously so that almost the full change of potential at the slider 138 is coupled to the control grid of tetrode 131. If the time constant in said control grid circuit is not changed, and if the current through the variable resistor 139, due to the conduction of the cathode follower 66, is neglected momentarily, the tetrode 131 will be rendered non-conducting for a period determined by said time constant circuit. Conduction of the cathode follower 66 alters the time that it takes for the capacitor 140 to discharge for a given time constant value in the control grid of said tetrode 131. The cathode of said cathode follower may be considered as returned to a positive source voltage when the capacitor 91 is negatively charged and for the period intermediate each cycle of the line voltage when the capacitor is not charged or is positively charged. The input to said cathode follower 66 is a portion of the preselected current pattern selected by the slider 102, the Low Heat control. At small positive portions of the current across the capacitor 91, the cathode follower 66 may conduct negligibly or not at all so that the current flowing through the variable resistor 139 will not appreciably change the potential of the side of the capacitor 140, connected to the slider 138.

Said capacitor will be effectively charged to the anode voltage of tetrode 69, 200 volts. Thus, the tetrode 131 will remain non-conducting a longer period since the voltage across the capacitor 140 cannot change instantaneously. Consequently, the thyratrons 17 and 18 will be fired late in the half cycles that make the anodes positive and only the magnitude of low heat current will be generated. At some intermediate level of the positive voltage developed across the capacitor 91, a larger input voltage will be coupled to the control grid of said cathode follower and considerably more current will flow through the variable resistor 139. Depending on the setting of the slider 138, either the full or only a portion of the voltage developed across the variable resistor 139 will be applied to the capacitor 140. Thus, the tetrode 131 will conduct once each cycle, starting at a point determined by the setting of the sliders 102 and 138, the Low Heat and Weld Heat controls, respectively. The setting of slider 138 controls the magnitude of intermediate current, with the largest current being developed when the tetrode 131 is energized within the shortest time after the tetrode 69 is energized. The Low Heat control may be calibrated in percent of Weld Heat so that low heat will be a fixed magnitude of weld heat or intermediate current. The slider 142 of the variable resistor 140a limits the positive potential developed at the slider 138 of variable resistor 139, and thus determines the limit for the longest period after the tetrode 69 becomes energized before the tetrode 131 can become energized again.

When the tetrode 131 fires, a pulse is coupled through the capacitor 145, causing the normally cut-off tetrode 147 to fire. The tetrode 156 becomes non-conducting when this occurs for a period of time determined by the capacitor 157, the setting of the slider 161 of the variable resistor 160, and the resistor 159. Negative pulses generated in the primary winding 152 cause positive pulses generated in the secondary winding 164 or 165 to trigger a normally non-conducting thyratron 17 or 18 whose anode is positive at this particular time. The time constant circuit of the components previously described is preadjusted so that the tetrode 156 fires again one-half cycle after the tetrode 147 fires. Negative pulses generated at the anode of said tetrode 156 cause positive pulses generated in the secondary winding 164 or 165 to trigger a normally non-conducting thyratron 17 or 18 whose anode is positive as the next half cycle. In this manner, trigger pulses are generated and delayed in time to cause the thyratrons 17 and 18 to develop initial current at a rate commensurate with the setting of the slider 104a, the Up Slope control. At the maximum value of preselected intermediate current, the thyratrons 17 and 18 are fired earliest in their positive half cycles over the duration preselected by the setting of the slider 121.

Thereafter, the rate of decay from the intermediate current level to a final heat current level occurs in accordance with the setting of the slider 103a, the Down Slope control, the thyratrons 17 and 18 being fired progressively later in the positive half cycles, in a manner analogous to that given previously for the increase of current, until the final heat level is reached. Said final heat level, before the abrupt decrease to zero current, is preselected by the setting of the slider 102 since said slider also determines when the cathode follower 66 becomes non-conductive.

In summary, there has been described a novel system wherein a preselected current pattern may be generated for a load, which may be the primary winding of a welding transformer. The novel features of the invention reside in the ability to preselect a magnitude of low heat current, which is a function of a preselectable magnitude of an intermediate current level, and which also determines the magnitude of a final heat current level. In addition, a rate of increase from the low heat current level to said intermediate current level, a duration for said intermediate current level, and a rate of decay from said intermediate current level to a final heat level may also be independently selected.

It is desired that the invention not be limited to the particular embodiment of the invention described herein as many equivalents will suggest themselves to those skilled in the art. It is accordingly desired that the appended claims be given a broad interpretation commensurate with the scope of the invention within the art.

What is claimed is:

1. In combination, an alternating energy source, switching means in series with said alternating source and a load, generating means for generating a control voltage including a storage device, adjustable charging means for controlling the period of time for charging said storage device to a predetermined fixed voltage, adjustable holding means for maintaining said fixed voltage on said storage device for a predetermined time, adjustable discharging means for discharging said storage device from said predetermined fixed voltage in a predetermined period of time, adjustable addition means for adding in series to the voltage on said storage device a selectable portion of the difference between said fixed voltage and said voltage on said storage device, and means for selecting said control voltage, said control voltage being an adjustable portion of said added voltages, pulse generating means connected to said switching means and to said generating means and responsive to said control voltage for controlling said switching means, means for energizing said pulse generating means at the time said storage device begins its charging period, means for de-energizing said pulse generating means upon completion of said discharging period of said storage device.

2. In combination, an alternating energy source, switching means in series with said alternating source and a load, generating means for generating a control voltage including a capacitor, adjustable charging means for controlling the period of time for charging said capacitor to a predetermined fixed voltage, adjustable holding means for maintaining said fixed voltage on said capacitor for a predetermined time, adjustable discharging means for discharging said capacitor from said predetermined fixed voltage in a predetermined period of time, adjustable addition means for adding in series to the voltage on said capacitor a selectable portion of the difference between said fixed voltage and said voltage on said capacitor, and means for selecting said control voltage, said control voltage being an adjustable portion of said added voltages, pulse generating means connected to said switching means and to said generating means and responsive to said control voltage for controlling said switching means, means for energizing said pulse generating means at the time said capacitor begins its charging period, means for de-energizing said pulse generating means upon completion of said discharging period of said capacitor.

3. In combination, an alternating energy source, switching means in series with said alternating source and a load, generating means for generating a control voltage including a storage device, adjustable charging means including a first unidirectional device and a first variable resistor for controlling the period of time for charging said storage device to a predetermined fixed voltage, adjustable holding means for maintaining said fixed voltage on said storage device for a predetermined time, adjustable discharging means including a second unidirectional device and a second variable resistor for discharging said storage device from said predetermined fixed voltage in a predetermined period of time, adjustable addition means for adding in series to the voltage on said storage device a selectable portion of the difference between said fixed voltage and said voltage, said control voltage being an adjustable portion of said added voltages, pulse generating means connected to said switching means and to said generating means and responsive to said control voltage for controlling said switching means, means for energizing said pulse generating means at the time said storage device begins its charging period, means for deenergizing said pulse generating means upon completion of said discharging period of said storage device.

4. In combination, an alternating energy source, switching means in series with said alternating source and a load, generating means for generating a control voltage including a storage device, adjustable charging means for controlling the period of time for charging said storage device to a predetermined fixed voltage, adjustable holding means including a pair of gaseous discharge devices the outputs of which energize and deenergize one another and a variable resistor for maintaining said fixed voltage on said storage device for a predetermined time, adjustable discharging means for discharging said storage device from said predetermined fixed voltage in a predetermined period of time, adjustable addition means for adding in series to the voltage on said storage device a selectable portion of the difference between said fixed voltage and said voltage on said storage device, and means for selecting said control voltage, said control voltage being an adjustable portion of said added voltages, pulse generating means connected to said switching means and to said generating means and responsive to said control voltage for controlling said switching means, means for energizing said pulse generating means at the time said storage device begins its charging period, means for de-energizing said pulse generating means upon completion of said discharging period of said storage device.

5. In combination, an alternating energy source, switching means including a pair of gaseous discharge devices connected in inverse parallel, in series with said alternating source and a load, generating means for generating a control voltage including a storage device, adjustable charging means for controlling the period of time for charging said storage device to a predetermined fixed voltage, adjustable holding means for maintaining said fixed voltage on said storage device for predetermined time, adjustable discharging means for discharging said storage device from said predetermined fixed voltage in a predetermined period of time, adjustable addition means for adding in series to the voltage on said storage device a selectable portion of the difference between said fixed voltage and said voltage on said storage device, and means for selecting said control voltage, said control voltage being an adjustable portion of said added voltages, pulse generating means connected to said switching means and to said generating means and responsive to said control voltage for controlling said pair of gaseous discharge devices on successive half cycles of said alternating source, means for energizing said pulse generating means at the time said storage device begins its charging period, means for de-energizing said pulse generating means upon completion of said discharging period of said storage device.

6. In combination, an alternating energy source, switching means including a pair of gaseous discharge devices each having an anode, a control grid, and a cathode, said alternating energy source connected to said anodes whereby said anodes are positively phased on each successive half cycle, generating means for generating a control voltage including a storage device, adjustable charging means for controlling the period of time for charging said storage device to a predetermined fixed voltage, adjustable holding means for maintaining said fixed voltage on said storage device for a predetermined time, adjustable discharging means for discharging said storage device from said predetermined fixed voltage in a predetermined period of time, adjustable addition means for adding in series to the voltage on said storage device a selectable portion of the difference between said fixed voltage and said voltage on said storage device, and means for selecting said control voltage, said control voltage being an adjustable portion of said added voltages, pulse generating means connected to said switching means and to said generating means and responsive to said control voltage for controlling said pair of gaseous discharge devices on each successive half cycle at preselected points in time when an anode is positively phased, means for energizing said pulse generating means at the time said storage device begins its charging period, means for de-energizing said pulse generating means upon completion of said discharging period of said storage device.

7. In combination, an alternating energy source, switching means including a pair of gaseous discharge devices each having an anode, a control grid, and a cathode, said gaseous discharge devices being connected in inverse parallel with an alternating source, a bias source connected between each of said cathode and control grids for rendering said gaseous discharge devices non-conducting until a preselected point in time, generating means for generating a control voltage including a storage device, adjustable charging means for controlling the period of time for charging said storage device to a predetermined fixed voltage, adjustable holding means for maintaining said fixed voltage on said storage device for a predetermined time, adjustable discharging means for discharging said storage device from said predetermined fixed voltage in a predetermined period of time, adjustable addition means for adding in series to the voltage on said storage device a selectable portion of the difference between said fixed voltage and said voltage on said storage device, and means for selecting said control voltage, said control voltage being an adjustable portion of said added voltages, pulse generating means connected to said switching means and responsive to said control voltage for controlling said pair of gaseous discharge devices on successive half cycles of said alternating source, means for energizing said pulse generating means at the time said storage device begins its charging period, means for de-energizing said pulse generating means upon completion of said discharging period of said storage device.

8. In combination, an alternating energy source, switching means in series with said alternating source and a load, generating means for generating a control voltage including a storage device, adjustable charging means for controlling the period of time for charging said storage device to a predetermined fixed voltage, adjustable holding means for maintaining said fixed voltage on said storage device for a predetermined time, adjustable discharging means for discharging said storage device from said predetermined fixed voltage in a predetermined period of time, adjustable addition means for adding in series to the voltage on said storage device a selectable portion on the difference between said fixed voltage and said voltage on said storage device, and means for selecting said control voltage, said control voltage being an adjustable portion of said added voltages, pulse generating means connected to said switching means and to said generating means and responsive to said control voltage for controlling said switching means including a first pair of gaseous discharge devices, with one of said first pair of gaseous discharge devices normally energized and the other of said first pair of said gaseous discharge devices normally de-energized, a phase-shift device connected said normally de-energized one of said first pair of gaseous discharge devices and to said alternating energy source for energizing said normally de-energized gaseous discharge device at a fixed point in every cycle of said alternating source whereby said normally energized gaseous discharge device becomes de-energized, a combination of means for adjusting the time at which said normally energized device becomes re-energized, means for producing a pulse upon said re-energization, a second pair of gaseous discharge devices with one of said second pair normally energized and the other of said second pair of gaseous discharge devices normally de-energized, said second pair connected to said first pair of gaseous discharge devices such that said pulse energizes said normally de-energized one of said second pair of gaseous discharge devices and de-energizes said normally energized one of said second pair of gaseous discharge devices, means for providing a fixed time interval for re-energization of said normally energized discharge device of said second pair of gaseous discharge devices, said fixed time interval being equal to one half cycle of said alternating energy source, means for providing pulses each time said normally energized gaseous discharge device of said second pair becomes energized or de-energized, means for energizing said pulse generating means at the time said storage device begins its charging period, means for de-energizing said pulse generating means upon completion of said discharging period of said storage device.

References Cited in the file of this patent

UNITED STATES PATENTS 2,739,281   Rockafellow _____ Mar. 20, 1956